(12) United States Patent
Straney et al.

(10) Patent No.: US 6,944,356 B2
(45) Date of Patent: Sep. 13, 2005

(54) LOCATING POINT OF INTEREST IN AN IMPAIRED IMAGE

(75) Inventors: Gale L. Straney, Aloha, OR (US); Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 603 days.

(21) Appl. No.: 10/145,427

(22) Filed: May 13, 2002

(65) Prior Publication Data
US 2003/0210833 A1 Nov. 13, 2003

(51) Int. Cl.[7] ................................................ G06K 9/36
(52) U.S. Cl. ........................ 382/291; 382/275; 382/284; 382/149; 358/426.04
(58) Field of Search ................................ 382/275, 284, 382/291, 130, 149, 155, 156; 358/504, 426.04; 348/606

(56) References Cited

U.S. PATENT DOCUMENTS

| | | | | |
|---|---|---|---|---|
| 4,343,021 A | * | 8/1982 | Frame | 348/247 |
| 4,668,989 A | * | 5/1987 | Mackereth | 348/597 |
| 4,747,146 A | * | 5/1988 | Nishikawa et al. | 382/112 |
| 5,132,798 A | * | 7/1992 | Yoshimura et al. | 348/239 |
| 5,170,441 A | * | 12/1992 | Mimura et al. | 382/165 |
| 6,016,354 A | * | 1/2000 | Lin et al. | 382/117 |
| 6,108,453 A | * | 8/2000 | Acharya | 382/254 |
| 6,200,823 B1 | * | 3/2001 | Steffan et al. | 438/14 |
| 6,285,410 B1 | * | 9/2001 | Marni | 348/576 |
| 6,591,398 B1 | * | 7/2003 | Kondo et al. | 348/451 |
| 6,690,839 B1 | * | 2/2004 | Ferguson | 382/274 |
| 6,795,784 B1 | * | 9/2004 | Shepard | 702/82 |
| 6,859,565 B2 | * | 2/2005 | Baron | 382/275 |

* cited by examiner

*Primary Examiner*—Bhavesh M. Mehta
*Assistant Examiner*—Manav Seth
(74) *Attorney, Agent, or Firm*—Francis I. Gray

(57) ABSTRACT

Locating of points of interest in an impaired image derived from video processing of a reference image is achieved by generating an impairment map for the impaired image. Then a cross-fade is performed between the impaired image and the impairment map so that points of interest indicated by the impairment map are accurately located on the impaired image.

8 Claims, 4 Drawing Sheets

LOCATING POINT OF INTEREST IN AN IMPAIRED IMAGE

BACKGROUND OF THE INVENTION

The present invention relates to video quality of service, and more particularly to a method of locating a point of interest in an impaired image using an impairment measurement map.

A video signal, after going through one or more iterations of video processing, such as compression, decompression, etc., may display perceptible impairments to a viewer. Part of determining video quality of service is to measure the amount of the impairment of the video signal. This is done using various impairment models, but most commonly used are PSNR and/or the human vision system model. This model generally takes the impaired video signal and compares it with an identical reference video signal that has not gone through the video processing, using an instrument such as the Tektronix PQA200 Picture Quality Analyzer. What is produced is a perceptual difference or impairment map representing subjective errors in the impaired video signal. The displayed intensity variations in the impairment map represent measurement values on a pixel-by-pixel basis. To determine where in the impaired video signal the points of interest represented by the impairment map are located requires some means for comparing the two images. This may be done by displaying the two images sequentially or side-by-side to provide a visual approximation.

What is needed is a means for easily locating or co-locating the point of interest in an impaired video signal corresponding to impairments represented by an impairment map for the impaired video signal.

BRIEF SUMMARY OF THE INVENTION

Accordingly the present invention provides a method of easily locating a point of interest in an impaired image using an impairment map of the impaired image. The impaired image is derived from a reference image due to processing that introduces impairments in the reference image. An impairment map is generated for the impaired image, the impairment map indicating points where the impairments occur. To locate the points of interest shown in the impairment map, a cross-fade is done between the impairment map and the impaired image.

The objects, advantages and other novel features of the present invention are apparent from the following detailed description when read in conjunction with the appended claims and attached drawing.

DETAILED DESCRIPTION OF THE INVENTION

Figure 1:
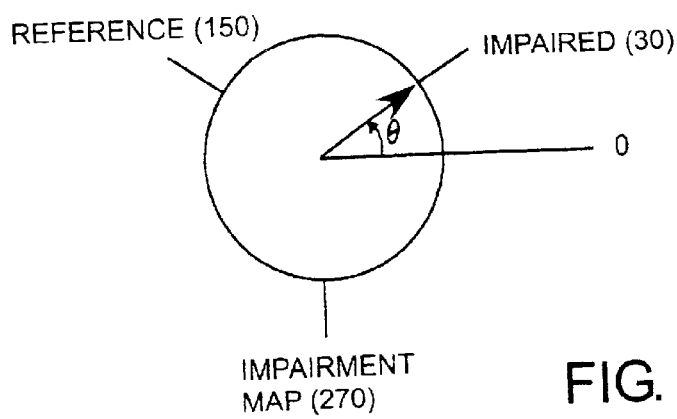
FIG. 1 is an illustrative view of a controller for locating a point of interest in an impaired image according to the present invention.

As shown in FIG. 1 there are potentially three inputs to a controller: a reference video signal; an impaired video signal corresponding to the reference video signal; and an impairment map. The impairment map is formed using a suitable instrument, such as the Tektronix PQA Picture Quality Analyzer mentioned above, that compares the reference video signal with the impaired video signal to produce the impairment map. The position of the controller, indicated by an arrow, controls the cross-fade between images or video inputs corresponding to the closest labels. Taking the horizontal line extending to the right as the zero axis and measuring counterclockwise, the impaired video signal corresponds to the 30° position, the reference signal corresponds to the 150° position and the impairment map corresponds to the 270° position. The relative weighting of these two inputs of the cross fades is set by the relative distances of the arrow to the respective labels. Given the relative positions of the labels in FIG. 1 and referring to FIG. 2:

| Dial Position ($\theta$) | W1 | W2 | W3 |
|---|---|---|---|
| 30°–150° | $(150 - \theta)/120$ | $(\theta - 30)/120$ | 0 |
| 150°–270° | 0 | $(270 - \theta)/120$ | $(\theta - 150)/120$ |
| 270°–360° | $(\theta - 270)/120$ | 0 | $(390 - \theta)/120$ |
| 0°–30° | $(\theta + 90)/120$ | 0 | $(30 - \theta)/120$ |

Figure 2:
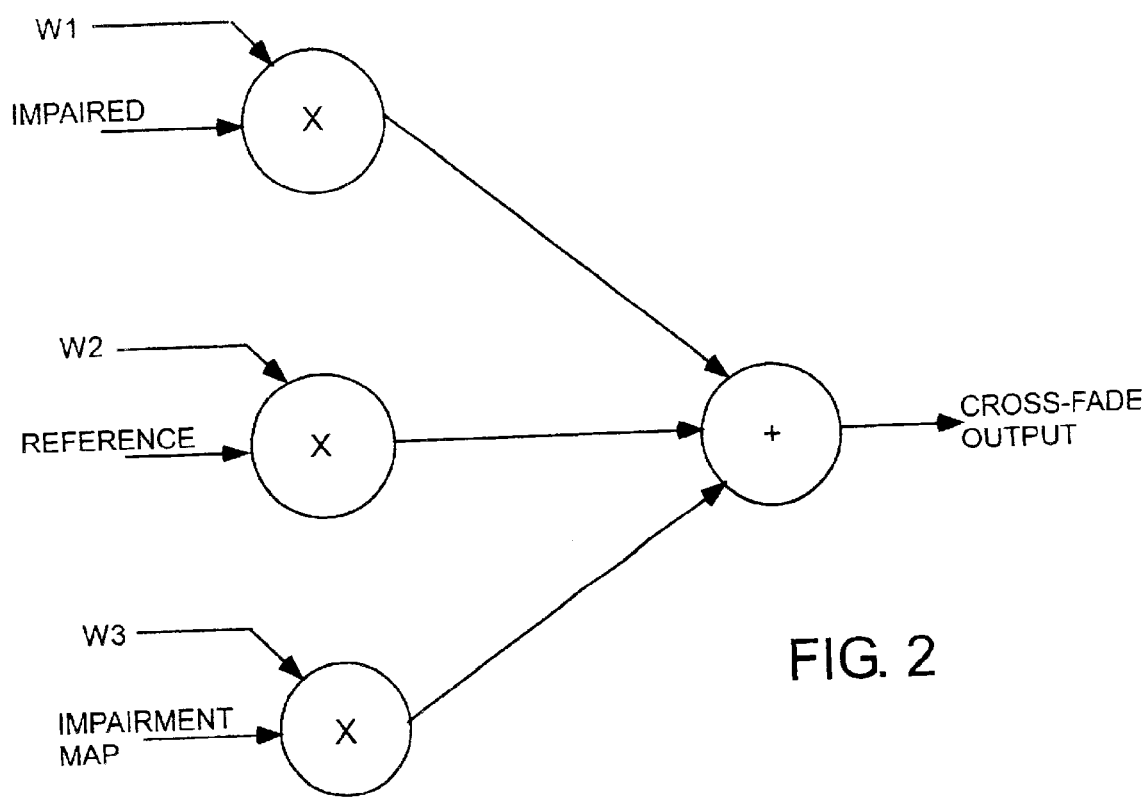
FIG. 2 is a block diagram of a three-way cross-fader for locating a point of interest in an impaired image according to the present invention.

FIG. 2 shows the respective inputs being input to respective multipliers together with the associated coefficient W1, W2, W3. The outputs from the multipliers are input to a summation circuit to provide a cross-fade output for display.

Figure 3:
FIG. 3 is an image view of an impaired image.
Figure 4:
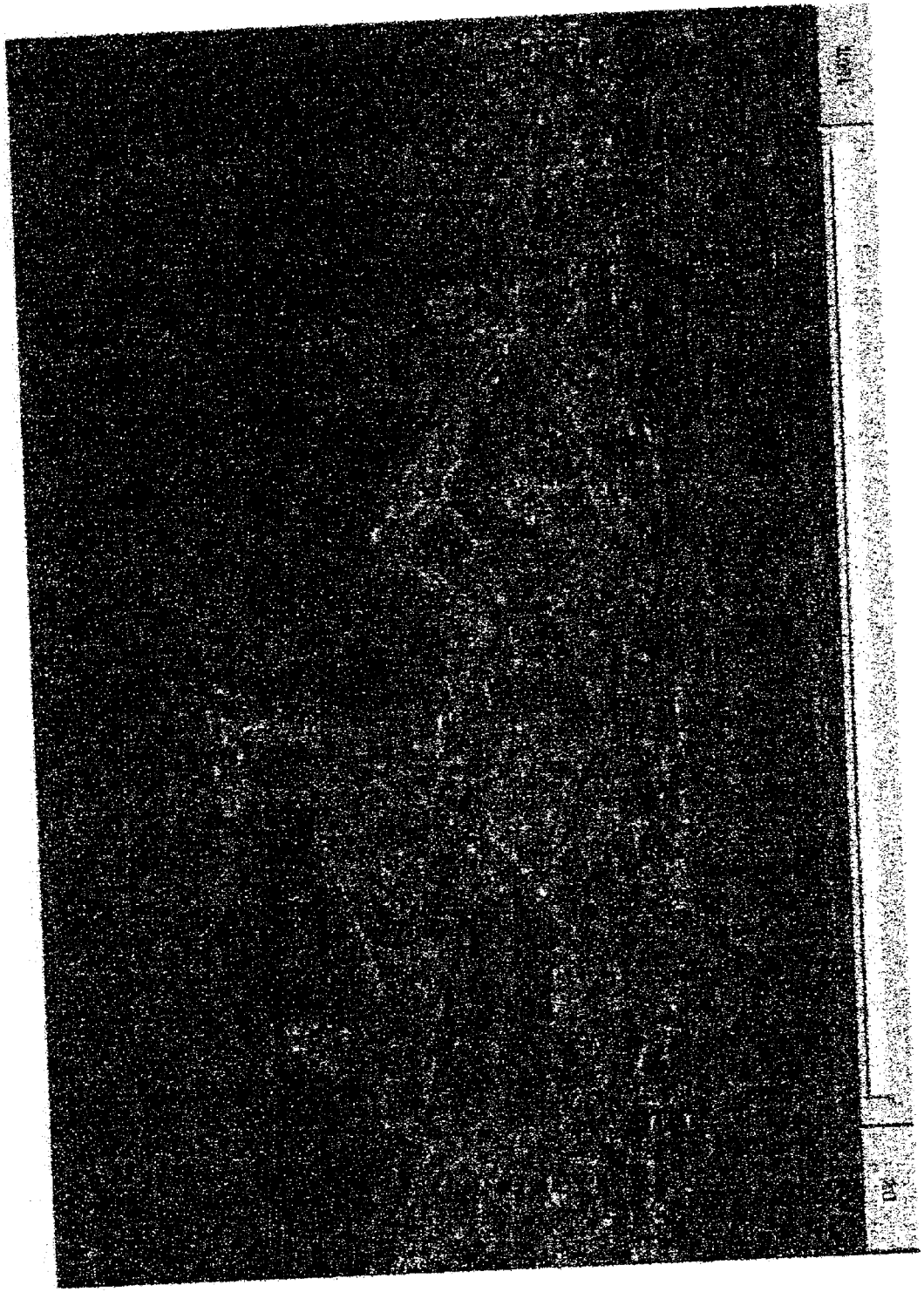
FIG. 4 is an image view of an impairment map.
Figure 5:
FIG. 5 is an image view of a combination of the impaired image and the impairment map according to the present invention.

After the impairment map is generated on a pixel by pixel basis, a pixel by pixel merge of two of the three input images, each weighted by individual percentages selectable by various methods, such as that illustrated above. Also shown in FIGS. 3, 4 and 5 are respectively 100% of the impaired image, 100% of the impairment map and a combination of 58% of the impairment map and 42% of the impaired image. FIG. 5 shows the usefulness of locating the intensity variances from the impairment map as they relate to the impaired image.

Thus the present invention provides a means for locating a point of interest in an impaired image by cross-fading between an impairment map for the impaired image and either the impaired image or a reference image corresponding to the impaired image.

What is claimed is:

1. A method of locating points of interest in an impaired image comprising the steps of:
   generating an impairment map for the impaired image from a reference image; and
   cross-fading between the impairment map and the impaired image to produce an output image so that the points of interest are located in the impaired image.

2. The method as recited in claim 1 wherein the cross-fading step further comprises cross-fading between the reference image and the impairment map to produce the output image so that the points of interest are located in the reference image.

3. The method as recited in claims 1 or 2 wherein the cross-fading step further comprises the step of cross-fading between the reference and impaired images to produce the output image.

4. The method as recited in claim 3 wherein the cross-fading step comprises the steps of:
   multiplying the impairment map, the impaired image and the reference image by respective weighting factor to produce a weighted impairment map, a weighted impaired image and a weighted reference image respectively; and summing the weighted impairment map, the weighted impaired image and the weighted reference image to produce the output image.

5. The method a recited in claim 4 wherein the impairment map, impaired image and reference image are conceptually separated by 120° about a periphery of a circle from each other and the respective weighting factors are a function of an angular position long the periphery.

6. An apparatus for easily locating a point of interest in an impaired image comprising:
   means for generating a impairment map for the impaired image from a reference image; and
   means for cross-fading between the impairment map, the impaired image and the reference image to produce an output image for locating the point of interest.

7. The apparatus as recited in claim 6 wherein the cross-fading means comprises:
   a multiplier corresponding to each of the impairment map, the impaired image and the reference image having as inputs one of the impairment map, the impaired image and the reference image and respective weighting factors and producing respective weighted outputs; and
   a summer for summing the weighted outputs to produce the output image.

8. The apparatus as recited in claim 7 wherein the impairment map, impaired image and reference image are conceptually separated by 120° about a periphery of a circle from each other and the respective weighting factors are a function of an angular position along the periphery.

* * * * *